United States Patent

Chen

(10) Patent No.: US 10,606,805 B2
(45) Date of Patent: Mar. 31, 2020

(54) OBJECT-LEVEL IMAGE QUERY AND RETRIEVAL

(71) Applicant: Red Hat, Inc., Raleigh, NC (US)

(72) Inventor: Huamin Chen, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 303 days.

(21) Appl. No.: 15/815,005

(22) Filed: Nov. 16, 2017

(65) Prior Publication Data

US 2019/0147047 A1 May 16, 2019

(51) Int. Cl.
*G06F 16/174* (2019.01)
*G06F 16/14* (2019.01)
*G06F 16/11* (2019.01)
*G06F 16/188* (2019.01)

(52) U.S. Cl.
CPC .......... *G06F 16/174* (2019.01); *G06F 16/113* (2019.01); *G06F 16/14* (2019.01); *G06F 16/188* (2019.01); *G06F 16/128* (2019.01)

(58) Field of Classification Search
USPC ....................................................... 707/692
See application file for complete search history.

(56) References Cited

U.S. PATENT DOCUMENTS

| | | | | |
|---|---|---|---|---|
| 8,769,196 B1 * | 7/2014 | Sadhu | ................. | G06F 12/0868 711/100 |
| 9,116,812 B2 * | 8/2015 | Joshi | ..................... | G06F 12/084 |
| 9,639,558 B2 | 5/2017 | Alton | | |
| 9,842,053 B2 * | 12/2017 | Joshi | .................. | G06F 12/0804 |
| 10,339,056 B2 * | 7/2019 | Joshi | ................... | G06F 12/0842 |
| 2012/0210066 A1 * | 8/2012 | Joshi | ................... | G06F 12/0866 711/118 |
| 2012/0210068 A1 * | 8/2012 | Joshi | ................... | G06F 9/45558 711/122 |

FOREIGN PATENT DOCUMENTS

| | | |
|---|---|---|
| CN | 106227579 A | 12/2016 |
| CN | 106506587 A | 3/2017 |
| CN | 107105029 A | 8/2017 |
| WO | WO 2017106726 A1 | 6/2017 |

OTHER PUBLICATIONS

Container Registry, https://azure.microsoft.com/en-in/services/container-registry/, 5 pgs.
Harter, Tyler et al., "Slacker: Fast Distribution with Lazy Docker Containers", https://www.usenix.org/node/194431, 3 pgs.

* cited by examiner

*Primary Examiner* — Cam Linh T Nguyen
(74) *Attorney, Agent, or Firm* — Haynes and Boone, LLP

(57) ABSTRACT

Methods, systems, and computer program products are included for querying and retrieving objects from images. An example method includes traversing a persistent local mirror overlay filesystem (PLMO FS) to determine whether one or more objects of a requested image already exist on a local data storage device. If so, an I/O hit is determined, and the objects are not pulled from the registry. Conversely, if the objects are not found on the local data storage device, an I/O miss is determined, and the objects are pulled from the registry. A local copy of the requested image is then built using the already locally-existing I/O-hit objects and the newly retrieved I/O-missed objects, such that the local copy of the requested image is a mirror of the original requested image in the registry.

20 Claims, 5 Drawing Sheets

OBJECT-LEVEL IMAGE QUERY AND RETRIEVAL

FIELD OF DISCLOSURE

The present disclosure generally relates to data processing, file management, and data structures, and more particularly to the retrieval of objects stored in a registry.

BACKGROUND

To ensure consistency across multiple development environments, software applications are often packaged into images that include collections of objects and metadata. Images, which are read-only, contain all of the necessary objects, such as files, scripts, libraries, settings, etc., to allow them to be run as standalone executables.

An image may be instantiated by running it within a container. Containers allow images to be isolated and run separately from one another. Images are comprised of layers, with each layer containing instructions. The layers, and thus the instructions, dictate how the image is built. For example, in an image for a webmail application, a first layer might set a base operating system image from a registry, a second layer might run an update for a web server, a third layer might add a database, and so forth.

A developer may create an entirely new image, or customize an existing image by adding, removing, or changing layers as he or she sees fit. When the developer is satisfied, the image may be built using a build command to create the application, for example, a webmail application. The application may be run in a container, and multiple applications may be simultaneously run by running multiple containers. Since every instance of the application image contains its own distribution environment, the application will perform consistently even across different environments based on the same kernel. However, the cost of such consistent performance is the retrieval of large amounts of data from the registry.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: requesting an image from a registry provided via a network. The operations further include receiving, from the registry, an address for the requested image. The operations further include receiving from the registry a directory structure corresponding to the requested image at the address, the directory structure providing identifiers of one or more layers of the requested image and identifiers of one or more objects that are included within the one or more layers. The operations further include traversing a local copy of the directory structure included in a persistent local mirror overlay file system (PLMO FS) to access a first object of the one or more objects from a local storage. The operations further include traversing the local copy of the directory structure included in the PLMO FS to determine an input/output (I/O) miss corresponding to a second object of the one or more objects. The operations further include, responsive to determining the I/O miss, retrieving the second object from the registry and storing the second object to the local storage. The operations further include building a local copy of the requested image from the local storage, the local copy including the first object and the retrieved second object. Other examples of this aspect include corresponding computer systems, apparatus, and computer programs recorded on one or more computer storage devices, each to perform the actions of the methods.

One general aspect includes a computer-implemented method including: requesting an image from a registry provided via a network. The method also includes receiving, from the registry, an address for the requested image. The method also includes receiving from the registry a directory structure corresponding to the requested image at the address, the directory structure providing identifiers of one or more layers of the requested image and providing identifiers of one or more objects that are included within the one or more layers. The method also includes traversing a local copy of the directory structure included in a persistent local mirror overlay file system (PLMO FS) to access an object of the one or more objects from a local storage. The method also includes traversing the local copy of the directory structure included in the PLMO FS to determine an input/output (I/O) miss corresponding to the traversed object of the one or more objects. The method also includes responsive to determining the I/O miss, retrieving an I/O-missed object from the registry and storing the I/O-missed object to the local data storage device. The method also includes building a local copy of the requested image from the local storage, the local copy including an I/O-hit object and the retrieved I/O-missed object. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause at least one machine to perform operations including: requesting an image from a registry provided via a network. The operations further include receiving, from the registry, an address for the requested image. The operations further include receiving from the registry a directory structure corresponding to the requested image at the address, the directory structure providing identifiers of one or more layers of the requested image and identifiers of one or more objects that are included within the one or more layers. The operations further include traversing a local copy of the directory structure included in a persistent local mirror overlay file system (PLMO FS) to access a first object of the one or more objects from a local storage. The operations further include traversing the local copy of the directory structure included in the PLMO FS to determine an input/output (I/O) miss corresponding to a second object of the one or more objects. The operations further include responsive to determining the I/O miss, retrieving the second object from the registry and storing the second object to the local storage. The operations further include building a local copy of the requested image from the local storage, the local copy including the first object and the retrieved second object. Other examples of this aspect include corresponding computer systems, apparatus, and computer programs recorded on one or more computer storage devices, each to perform the actions of the methods.

Figure 1:
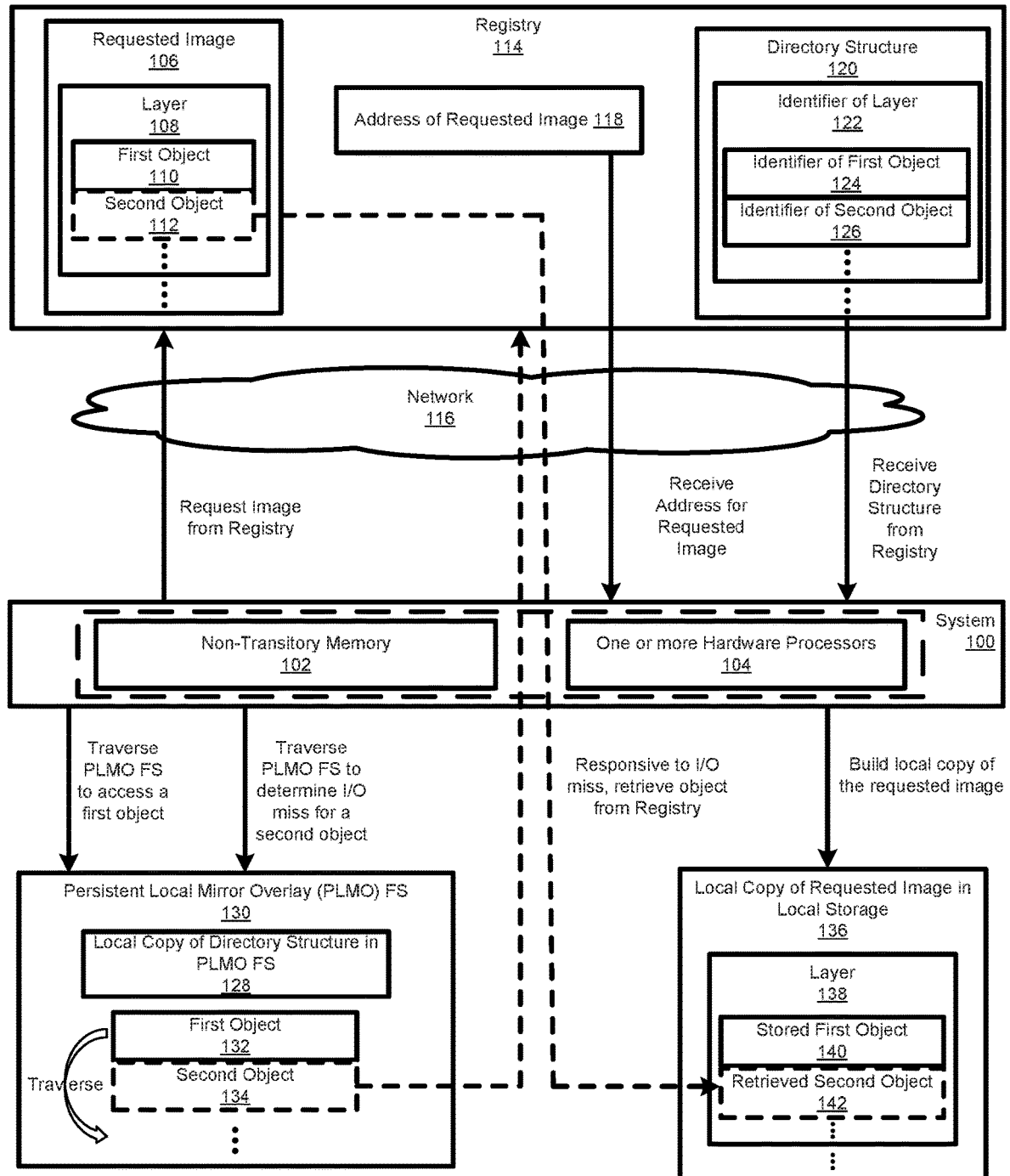
FIG. 1 is an organizational diagram illustrating a system including a non-transitory memory and one or more hardware processors for querying and retrieving objects from images, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Conventional techniques for retrieving objects from images for execution suffer from a number of problems. For example, while consistent and convenient, the concept of standalone images can also lead to redundancy and inefficiency if each image must independently contain everything needed to run it. To improve efficiency, image layers may be shared across multiple images, and update commands may be used to ensure that the latest versions of the image are being run. However, update commands may cause the entire image to be re-pulled from the registry, which leads to redundancy and inefficiency if only some objects within an image need to be updated. Worse, the entire image may be pulled from the registry even though the requesting client may already have most of the objects on a local data storage device. For example, an application requesting access to just one of the objects (e.g., a database) in an image (e.g., webmail) may be forced to pull all of the objects in the image, rather than specifically downloading only the particular object it needs. This unnecessary pulling of images and image layers not only wastes an initial amount of system resources and bandwidth ranging from hundreds of megabytes to gigabytes, but also leads to even more waste downstream as these superfluous images are unpacked and stored on a local disk.

Various examples described herein provide more efficient techniques for querying and retrieving objects from images. As a high-level overview, a persistent local mirror overlay file system (PLMO FS) provides a persistent image overlay over a local data storage device. When an image containing one or more objects is requested from a registry, the PLMO FS is traversed to determine whether the objects of the requested image already exist on a local data storage device. If so, an I/O hit is determined, and the objects are not pulled from the registry. Conversely, if the objects are not found on the local data storage device, an I/O miss is determined, and the objects are pulled from the registry. A local copy of the requested image is then built using the already locally-existing I/O-hit objects and the newly retrieved I/O-missed objects, such that the local copy of the requested image is a mirror of the original requested image in the registry.

In more detail regarding the PLMO FS, in some examples when the image is requested from the registry (for example by an application), the registry does not return the entire contents of the requested image. Instead, the registry returns data associated with the requested image, such as its address, its directory structure (including layers and object identifiers), its metadata, hashes, etc. The PLMO FS is traversed, and the associated data are used to determine whether the objects in the requested image already exist on a local data storage device. If the associated data match, for example if the object identifier of a first object on the PLMO FS matches with that of a corresponding object in the requested image, then that object is not pulled from the registry. However, if the associated data for the object do not match, then an I/O miss is determined for that particular object. More than one parameter may be considered in a match, i.e., there may be a set of match criteria. Thus, in some examples a successful match may include the matching of more than one type of associated data. For instance, a set of matching criteria including both object identifiers and metadata would require the matching of both the object's identifier and metadata in order for the match to be considered a successful match. Such matching criteria may be useful, for example where multiple versions of an object, each with the same object identifier, are present in an image. Additionally, the object references in the PLMO FS may also be organized into a directory structure mirroring that of the requested image, enabling a more efficient comparison of the respective directory structures and object references between the PLMO FS and the requested image.

If an I/O miss is determined, the objects flagged with an I/O miss (the I/O-missed objects) are pulled from the registry and stored on the local data storage device. A copy of the requested image, including its directory structure, is locally built on the local data storage device using the I/O-hit objects (found locally) and the retrieved I/O-missed objects (stored locally after retrieval). The directory structure of the local copy of the requested image is organized with the same layer and object structures as those of the requested image. In some examples, the directory structure and associated data received from the registry may be used as a reference to build the local copy of the requested image. In some examples, all of the associated data, such as layer identifiers, object identifiers, metadata and hashes, is included in the build. Thus, a complete copy of the requested image may be built by querying and retrieving specific objects from an image instead of pulling entire layers or the entire requested image from the registry.

The techniques herein provide useful advantages, such as reductions in: the use of bandwidth on a network; the time spent in needlessly pulling and extracting image layers;

latencies associated with pulling images from a network; image build time; computing processes and I/O utilization; storage device space utilization; and storage device cleaning activities. The freed resources can be used, for example, for hosting more images or increasing the performance of the images and the computing devices on which the images are run.

FIG. 1 is an organizational diagram illustrating a system 100 for querying and retrieving objects 112 from images 106.

The system 100 includes a non-transitory memory 102, and one or more hardware processors 104 coupled to the non-transitory memory 102. In the present example, the one or more hardware processors 104 executes instructions from the non-transitory memory 102 to perform operations to query and retrieve an object 112 from a requested image 106.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between various components of system 100. Components include an I/O component, such as a keyboard, mouse, touch interface, and/or camera that process(es) a user action such as a key press, click, tap, and/or gesture and sends a corresponding signal to the bus. In an example, a user may use the I/O component to command the system 100 to build a container using a requested image. Additionally, the user may request for the system 100 to pull one or more images from the registry 114. The I/O component may also include an output component such as a display.

The system 100 also includes a transceiver or network interface, which transmits and receives signals between system 100 and other devices via a communications link to the network 116. The network 116 may be a LAN, WLAN, PTSN, and/or various other wired or wireless networks, including telecommunications, mobile, and cellular phone networks, the internet, a cloud, a peer-to-peer sharing network, and/or any combination of networks thereof that is capable of interconnecting computing devices and/or computer programs. In an example, the transmission is wireless, although other transmission mediums and methods may also be suitable. The one or more hardware processors 104, which may be a micro-controller, digital signal processor (DSP), or other processing component, processes these various signals, such as for display on system 100 or transmission to other devices via the communications link. The one or more hardware processors 104 may also control transmission of information, such as cookies and internet protocol (IP) addresses, to other devices.

The non-transitory memory 102 provides instructions to the one or more hardware processors 104, which cause the one or more hardware processors 104 to perform actions responsive to those instructions. The non-transitory memory 102 and the one or more hardware processors 104 may be coupled on a same computing device and communicate via the bus, or on different computing devices communicating via a communication links to a network (e.g., such as a LAN, WLAN, PTSN, and/or various other wired or wireless networks, including telecommunications, mobile, and cellular phone networks, the internet, a cloud, a peer-to-peer sharing network, and/or any combination of networks thereof that is capable of interconnecting computing devices and/or computer programs). As merely one example of functionality that may be performed, the non-transitory memory 102 may provide instructions to the one or more hardware processors 104 to request an image 106 from the registry 114 over the network 116.

In some examples, the registry 114 is a network-based service where images can be stored, pushed and pulled. The service may be private, public, paid, or unpaid. In other examples, the registry 114 is a storage and content delivery system which holds images. In yet other examples, the registry 114 is a storage space on a network, the storage space containing images. In further examples, the registry 114 is a repository, or a collection of different images with the same name, but with different identifiers. For example, multiple images of the FEDORA operating system may be placed in the FEDORA repository. Each FEDORA image may have a different version number from the other, and each may have unique identifiers. In addition to storing images, the registry 114 may also store addresses and directory structures of the stored images. For example, in FIG. 1, the registry 114 stores the requested image 106, an address of the requested image 118, and a directory structure 120 of the requested image. In some examples, the address of the requested image 118 is an IP address, a uniform resource indicator (URI), a uniform resource locator (URL), or other form of network or web address.

The directory structure 120 may be organized into one or more layers corresponding to the one or more layers 108 of the requested image 106. The one or more corresponding layers includes one or more identifiers of layers 122, and may also include object identifiers corresponding with the objects within the one or more layers 108. A layer may have a single layer identifier, or may have multiple layer identifiers. In some examples, the object and/or layer identifiers include descriptive text such as file names or layer names. In other examples, the object and/or layer identifiers include non-descriptive alphanumeric text strings such as "513146fa4c2a44f264b78b5422114aec." The object and/or layer identifiers may each be of different formats, and may each be unique. In the present example, the identifier of the first object 124 corresponds with the first object 110, and the identifier of the second object 126 corresponds with the second object 112.

An image is a read-only template that includes all of the requirements for creating a container, which is a running instance of an image. A container adds a readable and writable layer on top of an image, and includes all of the dependencies necessary to run the image. For example, an image may contain an operating system, such as FEDORA, in a base layer. In a second layer, the image might contain a web server, and in the third, a webmail application. Conceptually, the image may be organized as a stack of layers, with each successive layer building upon the layer beneath it. Thus, the webmail application might be hosted on the web server beneath it, and the webmail server might use some of the kernel from the FEDORA operating system beneath that. In FIG. 1, the requested image 106 is shown including one or more layers 108. While particular types of images are identified in the above examples, other images may be used and the techniques described herein are not limited to these examples.

Multiple objects such as files, libraries, binaries, scripts, packages, etc., may exist within a layer, and commands such as add or run may result in the retrieval of all of the objects within that layer even though not all of the objects may be required by an application. In FIG. 1, a first object 110 (e.g., a library) and a second object 112 (e.g., a utility) are shown included within the one or more layers 108 (e.g., a web server). Based on a determination by a persistent local mirror overlay file system (PLMO FS) 130 to which the system 100 is coupled, the objects in the requested image 106 may either be found on the one or more local data storage devices storing the objects or pulled from the registry 114 via network 116. While particular libraries and applications are identified in the above examples, other objects may be used and the techniques described herein are not limited to these examples.

The PLMO FS 130 is a file system or a file system mount stored on one or more local data storage devices and overlays a persistent local storage over the image layers that reside in a registry. The one or more local data storage devices is each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more local data storage devices may include stored information that may be made available to one or more computing devices and/or computer programs (e.g., applications) coupled to the system 100 or a server using a computer network. In one example, the one or more data storage devices coupled to the memory in non-transitory memory 102 also serve(s) as the one or more local data storage devices storing the PLMO FS 130. In another example, the one or more local data storage devices storing the PLMO FS 130 is different from the one or more data storage devices coupled to the memory in non-transitory memory 102.

In some examples, the PLMO FS stores a local mirror of a requested image in the lower layer of an overlay file system. In some examples, image pulls are delegated to the PLMO FS, but before any images are pulled, the PLMO FS is first traversed to determine if the objects in the requested image are already stored on the local data storage device; if so, the objects will not be pulled again. In the present example, the PLMO FS 130 includes a local copy of a directory structure 128 corresponding to the directory structure 120 of the requested image 106.

In the present example, the PLMO FS 130 includes one or more objects, such as a first object 132 and a second object 134 as shown in FIG. 1. The one or more objects are stored on a local data storage device, which may be the same as the data storage device in non-transitory memory 102 or the local data storage device storing the PLMO FS 130. In some examples, if the PLMO FS 130 includes one or more objects, the one or more objects may be included in the local copy of the directory structure 128. In a further example, the one or more objects in the PLMO FS 130 may be organized within layers in the local copy of the directory structure 128. In other examples however, the local copy of the directory structure 128 may be blank, i.e., the PLMO FS stores no objects. In such examples, the PLMO FS 130 may include objects or data associated with the objects, but not the objects themselves. Thus, in some examples, the PLMO FS 130 may include a local copy of a directory structure, layer identifiers, object identifiers, metadata, and hashes, but not the one or more objects themselves. By contrast, in FIG. 1, the PLMO FS 130 shows the local copy of the directory structure 128, a first object 132, a second object 134, no layer identifiers, no object identifiers, and no metadata. Any combination of directory structure, layers, layer identifiers, objects, object identifiers, metadata, hashes, etc., is possible.

System 100 is also coupled to one or more local data storage devices storing a local copy of the requested image 136. The one or more local data storage devices storing a local copy of the requested image 136 may be the same as the data storage device in non-transitory memory 102, the one or more local data storage devices storing the PLMO FS 130, or any other local data storage device accessible to the system 100. The one or more local data storage devices storing a copy of the requested image in local storage 136 is each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more local data storage devices may include stored information that may be made available to one or more computing devices and/or computer programs (e.g., applications) coupled to the system 100 or a server using a computer network.

When the local copy of the requested image 136 is built, the local copy may be organized into one or more layers 138 corresponding to the one or more layers 108 of the requested image 106. Additionally, objects may be included within the one or more layers 138. As shown in FIG. 1, the one or more layers 138 includes a stored first object 140 and a retrieved second object 142. A build may be performed in a single stage or in multiple stages. In some examples, the building of the local copy commences even before all of the objects required for the build have been retrieved and stored on the local data storage device, while in other examples, no building commences until all of the objects required for the build are found on or pulled to the one or more local data storage devices. In some examples, the build is completed when the layers and objects of the local copy mirror those of the requested image. For example, if the first object 110 of registry image 106 were the top-most object in the top-most layer of one or more layers 108, then the stored first object 140 in the local copy of the requested image 136 would also be built as the top-most object in the top-most layer of one or more layers 138. Similarly, if the second object 112 of registry image 106 were the fourth object in the seventh layer of one or more layers 108, then the retrieved second object 142 in the local copy of the requested image 136 would also be built as the fourth object in the seventh layer of one or more layers 138. In other examples, the build is completed when the builder so determines, e.g., after he has completed modifying the image.

Figure 2:
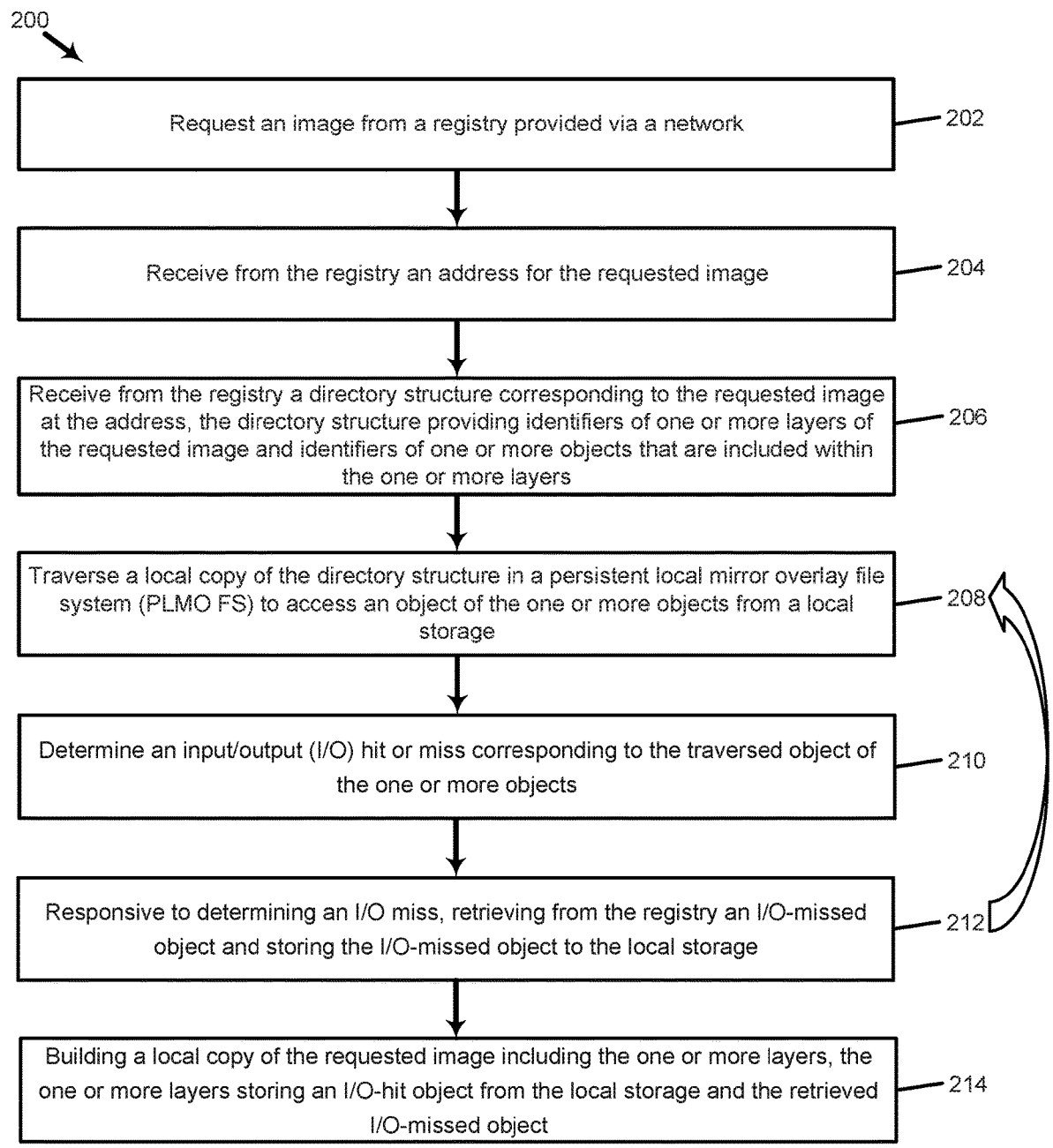
FIG. 2 is a flow diagram illustrating a method for querying and retrieving objects from images, in accordance with various examples of the present disclosure.

FIG. 2 is a flow diagram illustrating a method 200 for querying and retrieving objects from images, in accordance with various examples of the present disclosure. In some examples, the method is performed by executing computer-readable instructions that are stored in a non-transitory memory using one or more processors. The non-transitory memory and processors may be provided by, for example, the system 100 described with respect to FIG. 1. Additional steps may be provided before, during, and after the steps of method 200, and some of the steps described may be replaced, eliminated and/or re-ordered for other embodiments of the method 200. For example, a directory structure may be received before an image address, an I/O miss may occur before an I/O hit, a local copy of the directory structure may be built using only I/O-hit or only retrieved I/O-missed objects, etc. Method 200 may be performed, for example, in combination with the steps of method 400 and/or method 500 described with respect to FIG. 4. and/or FIG. 5 respectively. Method 200 may also be performed using the directory structure 320 and other elements described with respect to FIG. 3. In some examples, method 200 may be performed by one or more systems and/or registries.

At action 202, the system sends a request for an image to a registry via a network. In some examples, the request is generated by a user through a user input device, such as by using keywords, identifiers, hyperlinks, etc., entered via a keyboard, mouse, voice command, touch interface, virtual reality interface, etc. In other examples, the request is generated by an application, program, or other software local to the system. In another example, the request is generated by an application, program, or other software communicating via a network with the system. In further examples, the request may be generated responsive to certain events, such as an update being pushed to the registry. The request for the image may also include a request for data associated with the image, such as an address for the requested image, a directory structure providing identifiers of one or more layers of the layers of the requested image, identifiers of one or more objects in the image, metadata associated with the objects in the image, and hashes associated with the objects in the image. In some examples, the providing is performed by the directory structure alone. In other examples, the providing is performed by the registry through the directory structure. In further examples, the providing does not refer to the active provisioning or supplying of the one or more layers and object identifiers by the directory structure, but that the directory structure includes the one or more layers and object identifiers. Multiple images may be requested in a single request.

At action 204, the system receives from the registry via the network an address for the requested image. The address of the requested image may be an IP address, a uniform resource indicator (URI), a uniform resource locator (URL), or other form of network or web address. The same network and network interfaces in action 202 used in requesting the image from the registry may be used to receive the image address.

At action 206, the system receives from the registry a directory structure corresponding to the requested image at the address, the directory structure providing identifiers of one or more layers of the requested image and identifiers of one or more objects that are included within one or more layers of the requested image. For example, the received directory structure may identify the layers and objects by their file names, a unique identifier, hashes, code names, etc.

At action 208, the system traverses a local copy of the directory structure of the requested image in a PLMO FS to access an object of the one or more objects from a local data storage device. An object may be accessed by looking up or reading the object. The system may traverse the directory structure by any means, e.g., depth-first search or breadth-first search, and in any order, e.g., pre-order, in-order or post-order. The system may use the image address, directory structure, or object identifier (alone or in any combination) received from the registry at action 206 to search locally for the object.

In some examples, the system uses the received image address to locate the corresponding image in the PLMO FS, such as by searching all of the images in the PLMO FS with the same image address. The system may thereafter search for the object using more specific search criteria. Alternatively, or in addition to locating the image via the received image address, the system may also use the received directory structure to locate the object in the PLMO FS or in the local data storage device. For example, the system may read the received directory structure to determine that the object is the fifth object of the third layer of the requested image in the registry. Correspondingly, if the PLMO FS contains objects, the system accesses the fifth object of the third layer in the copy of the directory structure in the PLMO FS. However, if the PLMO FS does not contain objects, but only the data associated with the objects, then the system uses the associated data to look for the objects in the local data storage device. For example, if the identifier associated with the fifth object position of the third layer in the PLMO FS were "843132aa2h6f21g464x21e4432719deg," the system may directly look for the object in the local data storage device with that identifier.

In some examples, even though the PLMO FS had been traversed "to access" the object, the system may not actually read the object. In other words, the system may be able to determine whether an object on the PLMO FS is the same as an object on the registry without reading the object. For example, the system may determine that the objects are different without accessing the object if the associated data (e.g., metadata) of the registry object and the locally stored object differ. Such a determination may be made before, during, or after an object is accessed, if it is at all accessed.

At action 210, the system determines an I/O hit or miss corresponding to the traversed object of the one or more objects. An object for which the system has determined an I/O-hit may be referred to as an I/O-hit object. Conversely, if the conditions for an I/O hit are not met, then the system determines an I/O miss for that object. The system's I/O hit sensitivity may be programmed. It may be statically set or it may change dynamically depending on the strength of the match. In some examples of static I/O hit sensitivity, an I/O hit is determined only when the system is able to both access the object and determine that the additional matching criteria, i.e., criteria other than those which the system used to access the object, are met. In some examples of dynamic I/O hit sensitivity, the type and amount of additional matching criteria may change depending on the type of criteria matched and the amount of matches. For example, if the object identifier and version number match, no additional matching criteria may be dynamically added. But if, for example, only the file name and last modified date match, more criteria such as version number may be dynamically added. Thus, while the system may spend resources for additional verification to get a potential I/O hit, the net resources spent may be less than if the system had called an I/O miss and pulled the object from the registry. In other examples where no additional matching criteria have been set, an I/O hit may be determined when the system is able to access the object. For example, if the system finds the fifth object of the third layer in the local copy of the directory structure of the requested image in the PLMO FS, and if no additional matching criteria had been input to the system, the system may determine an I/O hit upon accessing the object. Conversely, in some examples, the system may be configured such that an I/O hit does not even require accessing the object. For example, the system may determine an I/O hit without accessing the object, if for example the object has a matching object identifier, and in addition to that, matching metadata. In other examples, the system may be configured to require a match of the object identifiers in addition to accessing the object. While particular techniques to determine an I/O hit or miss are identified in the above examples, other techniques may be used and the techniques described herein are not limited to these examples.

At action 212, in response to an I/O miss, the system retrieves from the registry the object for which the system had determined an I/O miss (the I/O-missed object) and stores it to the local data storage device. For example, if the system had failed to access the seventh object of the fourth layer locally, then the system would determine an I/O miss for that object. The system would then pull the seventh object of the fourth layer in the requested image from the registry and store that retrieved object locally. Actions 208-212 may be repeated as many times as necessary to pull all of the objects necessary to complete the building of a local copy of the requested image at action 214.

At action 214, the system builds a local copy of the requested image from the local data storage device, the local copy including the I/O-hit object and the retrieved I/O-missed object. In some examples, the I/O-hit objects and the retrieved I/O-missed objects are built into their corresponding layers, such that the layers and the objects in the copy of the requested image in the local data storage device mirror those of the requested image in the registry. For example, the third layer in the local copy of the requested image would be the same as the third layer of the requested image in the registry, and the fifth object of the third layer (the I/O-hit object from the previous examples) in the local copy of the requested image would be the same as the fifth object of the third layer in the requested image on the registry. Similarly, the seventh object of the fourth layer (the retrieved I/O-missed object from the previous examples) would also be the same as the corresponding object in the requested image on the registry. In some examples, the system begins building the local copy of the requested image while actions 208-212 are still being performed. In other words, the system may begin the build even though not all of the I/O-missed objects have been retrieved. For example, the system may begin the build even though only 30% of the I/O-missed objects have been retrieved and stored on the local data storage device. In some examples, the system begins by building I/O-hit objects first; in others, it begins by building I/O-missed objects first. In other examples, the system begins building only after a threshold is reached. In some examples, the threshold is dynamic; in others, it is static. In some examples, the threshold is set by resource utilization, e.g., processor, network or I/O utilization, alone or in any combination. In other examples, the threshold is set by a proportion of the requested image on the local data storage device, e.g., begin building when 50% of the requested image size is found locally (counting I/O-hit objects only or a combination of I/O-hit and retrieved I/O-missed objects).

Figure 3:
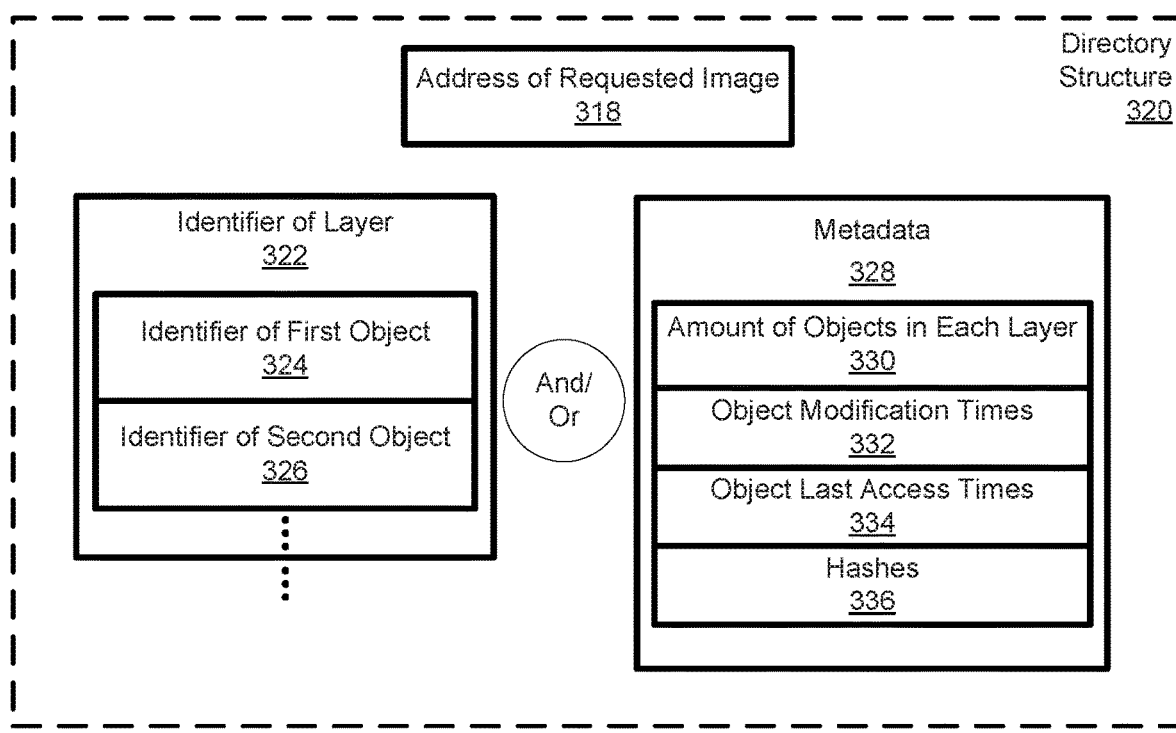
FIG. 3 is an organizational diagram illustrating a directory structure that includes object identifiers and metadata, in accordance with various examples of the present disclosure.

FIG. 3 is an organizational diagram illustrating a directory structure 320 which includes an address of a requested image, 318, an identifier of layer 322, an identifier of a first object 324 and an identifier of a second object 326, and/or metadata 328, in accordance with various examples of the present disclosure. In some examples, the directory structure may include more image addresses, layer identifiers, and object identifiers than shown in FIG. 3. In some examples, the directory structure 320 mirrors the directory structure 120 of the requested image 106 in FIG. 1, such that the address of the requested image 318 corresponds to the address of the requested image 118, the one or more layers of the directory structure 320 corresponds to the one or more layers of the directory structure 120, the identifier of layer 322 corresponds to the identifier of layer 122, the identifier of the first object 324 corresponds with the identifier of the first object 124, and so on.

In addition to the abovementioned features of the directory structure 120, in some examples the directory structure 320 may additionally include metadata 328. Metadata 328 may refer to data describing amounts of the one or more objects stored in each layer of the one or more layers, 330, object modification times 332 corresponding to the one or more objects, object last access times 334 corresponding to the one or more objects, and hashes 336 corresponding to the one or more objects. Metadata 328 may also include the file sizes corresponding to the one or more objects. The directory structure 320 may include the address of the requested image 318 and the metadata 328, or may include the address of the requested image 318, one or more identifiers of layers, and one or more identifiers of objects.

Figure 4:
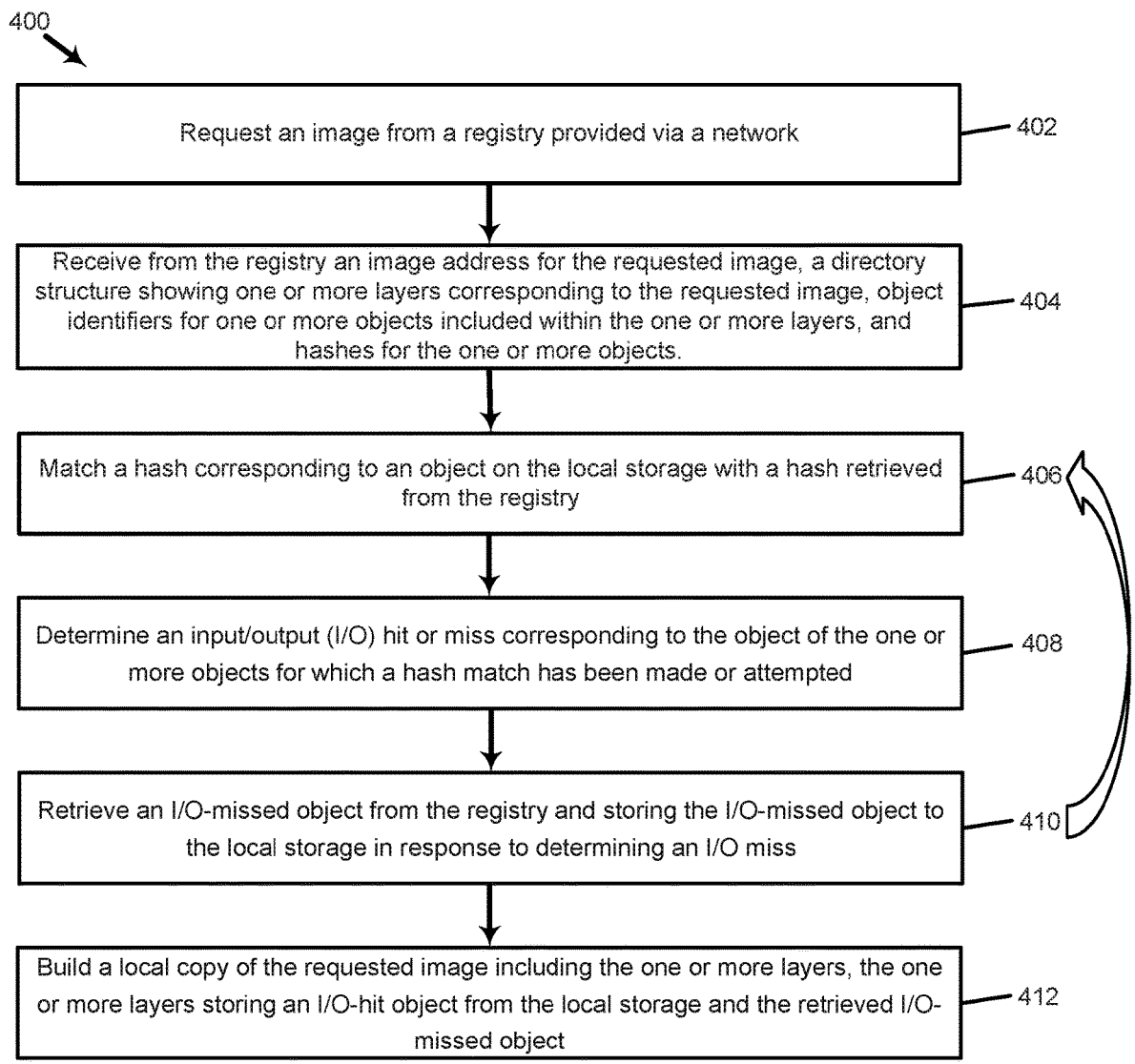
FIG. 4 is a flow diagram illustrating a method for querying and retrieving objects from images using hash matching, in accordance with various examples of the present disclosure.

FIG. 4 is a flow diagram illustrating a method 400 for querying and retrieving objects from images using hash matching, in accordance with various examples of the present disclosure. In some examples, the method is performed by executing computer-readable instructions that are stored in a non-transitory memory using one or more processors. The non-transitory memory and processors may be provided by, for example, the system 100 described with respect to FIG. 1. Additional steps can be provided before, during, and after the steps of method 400, and some of the steps described can be replaced, eliminated and/or re-ordered for other embodiments of the method 400. Method 400 may be performed, for example, in combination with the steps of method 200 described with respect to FIG. 2. Method 400 may also be performed using the directory structure 320 and other elements described with respect to FIG. 3. In some examples, method 400 may be performed by one or more systems and/or registries.

At action 402, the system requests an image from a registry provided via a network.

At action 404, the system receives from the registry an address for the requested image, a directory structure providing one or more layers of the requested image, and object identifiers for one or more objects included within the one or more layers. Additionally, the system also receives hashes for the one or more objects. The hashes may be in any suitable format, for example Secure Hashing Algorithm (SHA) or MD5 formats, and may be of any suitable bit length.

At action 406, the system matches a hash corresponding to an object on the local data storage device with a hash retrieved from the registry. For example, the hash function may map each object into a table, and collect in each bucket a list of all the objects with the same hash value. Duplicate objects, if any, will end up in the same bucket. The system can search for duplicates by scanning every bucket containing two or more objects, accessing them, and comparing them. Alternatively, or in addition, the system may compare duplicate objects without accessing them, e.g., by comparing their identifiers and/or their metadata. The system may additionally use the same hashing technique just described to compare other data associated with the object, such as its identifiers and/or metadata, for a multi-parameter matching criteria.

At action 408, the system determines an I/O hit or miss corresponding to the object of the one or more objects for which a hash match has been made or attempted. The hash matching criteria may include not only object hashes, but also object identifiers, and metadata. For example, if the table sorting method described in action 406 were used, the system in that case would determine I/O hits for objects in buckets containing two or more objects and where the additional matching criteria are met ("I/O-hit" objects). Conversely, the system would determine I/O misses for objects in buckets containing only one object, or whenever the object in the bucket fails to meet the matching criteria ("I/O-missed" object). While particular techniques for hash matching are identified in the above examples, other techniques may be used and the techniques described herein are not limited to these examples.

At action 410, in response to determining an I/O miss, the system retrieves an I/O-missed object from the registry and stores the I/O-missed object to the local data storage device. Actions 406-410 may be repeated as many times as necessary to gather all of the objects necessary to complete the building of a local copy of the requested image at action 412.

At action 412, the system builds a local copy of the requested image from the local data storage device, the local copy including the I/O-hit object and the retrieved I/O-missed object. In some examples, the I/O-hit objects and the retrieved I/O-missed objects are built into their corresponding layers, such that the layers and objects of the copy of the requested image in local data storage device mirror those of the requested image in the registry.

Figure 5:
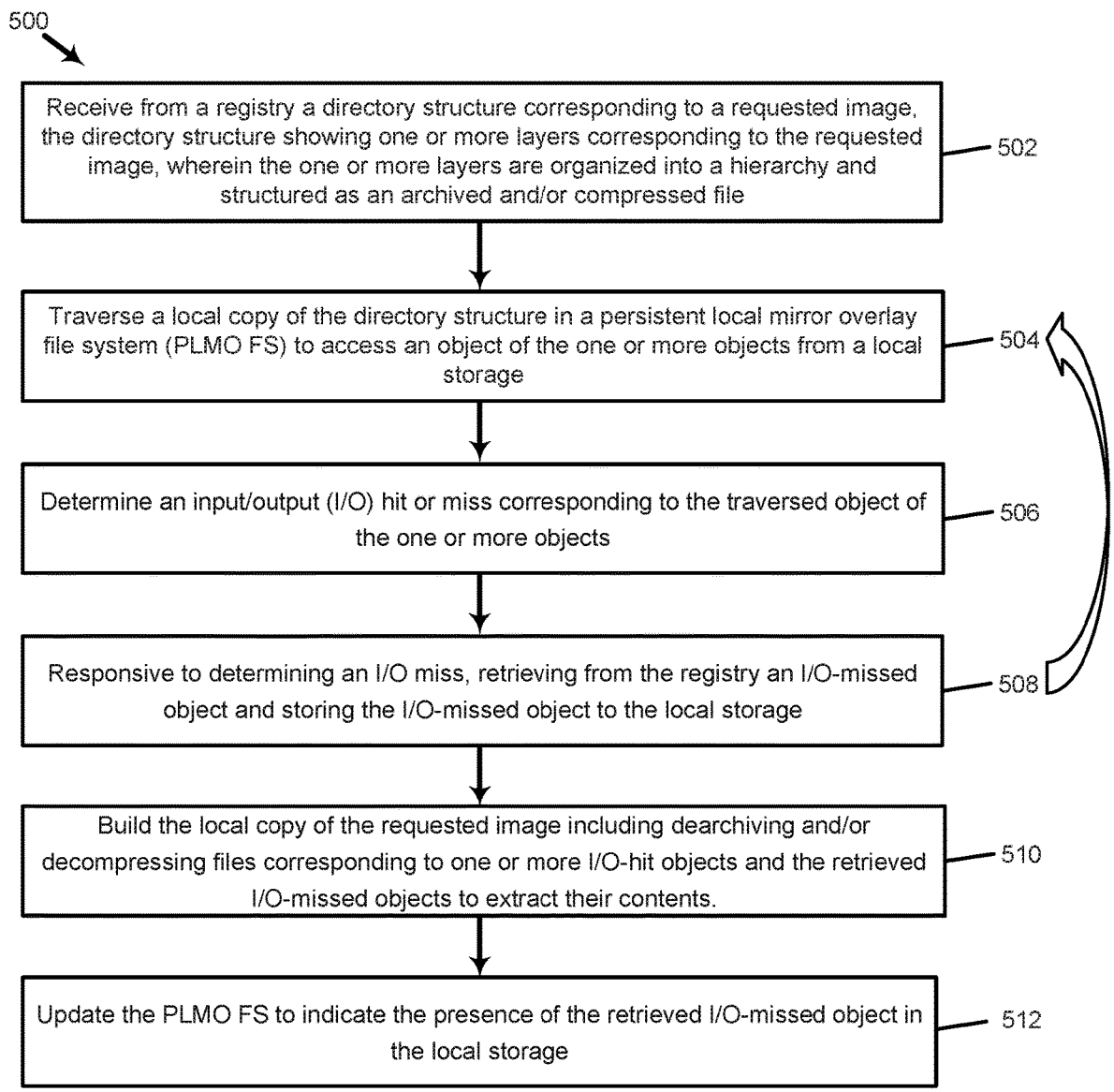
FIG. 5 is a flow diagram illustrating a method for querying and retrieving objects from images and updating a file system, where the image layers are organized into a hierarchy and/or are structured as compressed files, in accordance with various examples of the present disclosure.

FIG. 5 is a flow diagram illustrating a method 500 for querying and retrieving objects from images and updating a file system, where the one or more image layers are organized into a hierarchy, and the one or more objects included within the one or more layers are structured as an archived and/or compressed file, in accordance with various examples of the present disclosure. In some examples, the method is performed by executing computer-readable instructions that are stored in a non-transitory memory using one or more processors. The non-transitory memory and processors may be provided by, for example, the system 100 described with respect to FIG. 1. Additional steps can be provided before, during, and after the steps of method 500, and some of the steps described can be replaced, eliminated and/or re-ordered for other embodiments of the method 500. Method 500 may be performed, for example, in combination with the steps of method 200 and/or 400 described with respect to FIG. 2 and FIG. 4. Method 500 may also be performed using the directory structure 320 and other elements described with respect to FIG. 3. In some examples, method 500 may be performed by one or more systems and/or registries.

At action 502, the system receives from a registry a directory structure corresponding to a requested image, the directory structure providing identifiers of one or more layers of the requested image and object identifiers for one or more objects included within the one or more layers, wherein the one or more layers are organized into a hierarchy and the one or more objects are structured as archived and/or compressed files. The directory structure may include identifiers of one or more objects, metadata, or hashes for the one or more objects.

In some examples, the one or more image layers (e.g., layer 108 of FIG. 1) are organized into a hierarchy. In other examples, the one or more layers are further structured as an archived and/or compressed file. The one or more layers may be organized into hierarchies such as parent-child relationships, dependencies, object trees, etc. Further, the one or more layers may be archived and/or compressed into any file format, such as .zip, .tar, .tar.bz, .tar.gz, tar.xz, etc. In some examples, a single layer is contained in a single archived or compressed file. In other examples, multiple layers are contained in a single archived or compressed file. In further examples, the image may be comprised of a single archived or compressed file; in other examples, the image may be comprised of multiple archived or compressed files.

One or more objects are included within the one or more layers, and the one or more objects are structured as archived and/or compressed files, e.g., .tar files. Thus, the requested image may include .tar objects (which themselves may be .tar files) within .tar layers. In some examples, the system receives a directory structure showing objects, such as libraries or utilities, within each .tar layer and/or each .tar object. In other examples, the system receives a directory structure providing further data such as identifiers, metadata, or hashes associated with the objects within each .tar layer and/or .tar object. In further examples, additional commands may need to be input to the system to show the objects within each .tar layer and/or .tar object, or to retrieve the data associated with the .tar layer and/or .tar object. The additional commands may be entered before, during, or after the commands to request the image. In some examples, the command to inspect an image may be used to retrieve data associated with a .tar layer without extracting, e.g., dearchiving or decompressing, the image. In other examples, a list command may be used to list the contents of the one or more archived or compressed files without extracting the files. In yet other examples, the command(s) to request the image may already include sub-commands to inspect or list the contents of a .tar layer or object, such that the image request returns the image directory structure and shows the contents of the objects or files within each .tar layer or .tar object without the need for a user to input separate commands.

At action 504, the system traverses a local copy of the directory structure in a PLMO FS to access an object of the one or more objects from a local data storage device. Even if the objects are structured as archived and/or compressed files, the system is not prevented from identifying the objects and the data associated with the objects. For example, the system may first request a listing of the contents in the archived and/or compressed file for two layers, layer1.tar and layer2.tar. The system may receive a listing showing two layers, e.g., layer1 and layer2, and two objects, e.g., object1.tar in layer1 and object2.tar in layer2. Next, the system may request a listing of the contents of each object, and the listing may show objects within objects. For example, the listing may show that object1.tar includes a library object, lib1.tar with identifier 936452ad2h6t134g132e69f421234dga, and a utility object, util1.tar with no identifier. The system may then traverse the PLMO FS for one or more objects (which may be objects within objects), or for data associated with the one or more objects (which may be objects within objects). For example, the system may traverse the PLMO for the object, object1.tar; for the library object lib1.tar within object1.tar; for the identifier 936452ad2h6t134g132e69f421234dga corresponding to the library object lib1.tar within object1.tar; for the utility object, util1.tar, etc.

At action 506, the system determines an I/O hit or miss corresponding to the traversed object of the one or more objects. Continuing with the earlier example, if the system is unable to locate object1.tar in layer1 of the PLMO FS, the system may determine an I/O miss for object1.tar. However, even if the system finds object1.tar in layer1, the system may still determine an I/O miss depending on the sensitivity of the matching criteria. For example, additional matching criteria may require the system to additionally match the identifiers of the objects within the object. Thus, the system may determine an I/O hit for lib1.tar only if a library named lib1.tar with identifier 936452ad2h6t134g132e69f421234dga were found on the local data storage device. Under the example additional matching criteria, the system may determine an I/O miss for util1.tar since it has no identifier, but an I/O hit for lib1.tar assuming its identifier were found on the local data storage device.

At action 508, responsive to determining an I/O miss, the system retrieves from the registry an I/O-missed object and stores the I/O-missed object to the local data storage device. Returning to the earlier example, if the identifier for object1.tar was not found in the PLMO FS, the system may determine an I/O miss and retrieve object1.tar from the registry. In other examples, which may include additional matching criteria, the system may retrieve objects within objects, such as util1.tar or lib1.tar from the earlier example. Actions 504-506 may be repeated as many times as necessary to gather all of the objects necessary to complete the building of a local copy of the requested image at action 412.

At action 510, the system builds a local copy of the requested image from the local data storage device, including dearchiving and/or decompressing the archived and/or compressed files corresponding to the I/O-hit and I/O-missed objects to extract their contents. Returning to the previous example, and assuming that the system has found object1.tar and lib1.tar locally, but not util1.tar, the system may retrieve util1.tar, and dearchive and/or decompress util1.tar to extract its contents. In some examples, the system may not be able to retrieve an object of an object directly (e.g., util1.tar), and may have to retrieve the object in a higher level of the hierarchy (e.g., object1.tar) to retrieve the object of an object. In some examples, the system may perform two dearchivals and/or decompressions (e.g., first: object1.tar; second: util1.tar) to extract the contents of the object within an object (e.g. util1.tar). After the dearchiving and/or decompressing, the local copy of the requested image may be built using the extracted objects. In some examples the archived and/or compressed files corresponding to the I/O-hit and I/O-missed objects are extracted in place into their corresponding layers, such that the layers and objects of the copy of the requested image in the local data storage device mirror those of the requested image in the registry. In other examples, the archived and/or compressed files corresponding to the I/O-hit and I/O-missed objects are extracted into the local data storage device without initial regard to the directory structure, but later assembled into their corresponding layers such that the layers and objects of the copy of the requested image in the local data storage device mirror those of the requested image in the registry.

At action 512, the system updates the PLMO FS to indicate the presence of the retrieved I/O-missed object in the local data storage device. While illustrated as proceeding action 510, action 512 may also precede action 510. Further to updating the PLMO FS to indicate the presence, the system may also update any object identifiers, hashes, hash tables, and/or metadata associated with the retrieved I/O-missed object. Additionally, a history of updates may be captured, for example in a log file. The system may also correlate the data associated with the extracted I/O-missed object with the data associated with the archived and/or compressed file corresponding to the I/O-missed object.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A system comprising:
a non-transitory memory; and
one or more hardware processors coupled to the non-transitory memory to execute instructions from the non-transitory memory to perform operations comprising:
requesting an image from a registry provided via a network;
receiving, from the registry, an address for the requested image;
receiving from the registry a directory structure corresponding to the requested image at the address, the directory structure providing identifiers of one or more layers of the requested image and identifiers of one or more objects that are included within the one or more layers;
traversing a local copy of the directory structure included in a persistent local mirror overlay file system (PLMO FS) to access a first object of the one or more objects from a local storage;
traversing the local copy of the directory structure included in the PLMO FS to determine an input/output (I/O) miss corresponding to a second object of the one or more objects;
responsive to determining the I/O miss, retrieving the second object from the registry and storing the second object to the local storage; and building a local copy of the requested image from the local storage, the local copy including the first object from the local storage and the retrieved second object.

2. The system of claim 1, wherein the one or more layers are organized into a hierarchy.

3. The system of claim 1, wherein each layer of the one or more layers is structured as an archived and/or a compressed file.

4. The system of claim 1, wherein the directory structure received from the registry includes metadata describing amounts of the one or more objects stored in each layer of the one or more layers, modification times corresponding to the one or more objects, last access times corresponding to the one or more objects, hashes corresponding to the one or more objects, and sizes corresponding to the one or more objects.

5. The system of claim 1, wherein the first and second objects are structured as archived and/or compressed files, and building the local copy of the requested image includes dearchiving and/or decompressing the archived and/or compressed files to extract their contents.

6. The system of claim 1, further comprising updating the PLMO FS to indicate the presence of the second object in the local storage.

7. The system of claim 1, further comprising matching a hash corresponding to the first object on the local storage with a hash retrieved from the registry.

8. A computer-implemented method comprising:
requesting an image from a registry provided via a network;
receiving, from the registry, an address for the requested image;
receiving from the registry a directory structure corresponding to the requested image at the address, the directory structure providing identifiers of one or more layers of the requested image and identifiers of one or more objects that are included within the one or more layers;
traversing a local copy of the directory structure included in a persistent local mirror overlay file system (PLMO FS) to access an object of the one or more objects from a local storage;
determining an input/output (I/O) hit or miss corresponding to the traversed object of the one or more objects;
responsive to determining the I/O miss, retrieving from the registry an I/O-missed object and storing the I/O-missed object to the local storage; and
building a local copy of the requested image from the local storage, the local copy including an I/O-hit object and the retrieved I/O-missed object.

9. The method of claim 8, wherein the one or more layers are organized into a hierarchy.

10. The method of claim 8, wherein each layer of the one or more layers is structured an archived and/or a compressed file.

11. The method of claim 8, wherein the directory structure received from the registry includes metadata describing amounts of the one or more objects stored in each layer of the one or more layers, modification times corresponding to the one or more objects, last access times corresponding to the one or more objects, hashes corresponding to the one or more objects, and sizes corresponding to the one or more objects.

12. The method of claim 8, wherein the I/O-hit and I/O-missed objects are structured as archived and/or compressed files, and building the local copy of the requested image includes dearchiving and/or decompressing the archived and/or compressed files to extract their contents.

13. The method of claim 8, further comprising updating the PLMO FS to indicate the presence of the I/O-missed object in the local storage.

14. The method of claim 8, further comprising matching a hash corresponding to the traversed object with a hash retrieved from the registry.

15. A non-transitory machine-readable medium having stored thereon machine-readable instructions executable to cause at least one machine to perform operations comprising:
requesting an image from a registry provided via a network;
receiving, from the registry, an address for the requested image;
receiving from the registry a directory structure corresponding to the requested image at the address, the directory structure providing identifiers of one or more layers of the requested image and identifiers of one or more objects that are included within the one or more layers;
traversing a local copy of the directory structure included in a persistent local mirror overlay file system (PLMO FS) to access a first object of the one or more objects from a local storage;
traversing the local copy of the directory structure included in the PLMO FS to determine an input/output (I/O) miss corresponding to a second object of the one or more objects;
responsive to determining the I/O miss, retrieving the second object from the registry and storing the second object to the local storage; and
building a local copy of the requested image from the local storage, the local copy including the first object from the local storage and the retrieved second object.

16. The non-transitory machine-readable medium of claim 15, wherein the one or more layers are organized into a hierarchy.

17. The non-transitory machine-readable medium of claim 15, wherein each layer of the one or more layers is structured as an archived and/or compressed file.

18. The non-transitory machine-readable medium of claim 15, wherein the directory structure received from the registry includes metadata describing amounts of the one or more objects stored in each layer of the one or more layers, modification times corresponding to the one or more objects, last access times corresponding to the one or more objects, hashes corresponding to the one or more objects, and sizes corresponding to the one or more objects.

19. The non-transitory machine-readable medium of claim 15, wherein the first and second objects are structured as archived and/or compressed files, and building the local copy of the requested image includes dearchiving and/or decompressing the archived and/or compressed files to extract their contents.

20. The non-transitory machine-readable medium of claim 15, further comprising updating the PLMO FS to indicate the presence of the second object in the local storage.

* * * * *